June 25, 1929. C. J. ROCQUIN 1,718,436

HANDLE HOLDER

Filed Dec. 20, 1927

Inventor:
Camille J. Rocquin;
by his Attorneys,
Baldwin Wight

Patented June 25, 1929.

1,718,436

UNITED STATES PATENT OFFICE.

CAMILLE J. ROCQUIN, OF NEW ORLEANS, LOUISIANA.

HANDLE HOLDER.

Application filed December 20, 1927. Serial No. 241,385.

This invention relates to means for quickly and detachably connecting the usual wooden handle to the frame member of a tool, such as a rake, hoe, scoop net, or the like. It is intended to provide a detachable connection which will be simple and efficient and which will permit the separation of the parts very readily. Details of the invention will be apparent from the following description and the appended claims.

The usual wooden handle A is illustrated and there is shown one end of a frame member B which may be connected in any desired manner to a hoe, rake, or similar tool. This member B may be a part of the frame thereof or it may be a separate member, suitably connected to said tool.

Figure 2:
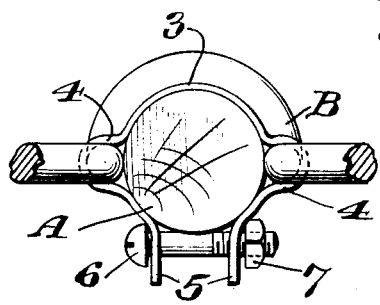
Figure 2 is a section on line 2—2 of Figure 1.
Figure 3:
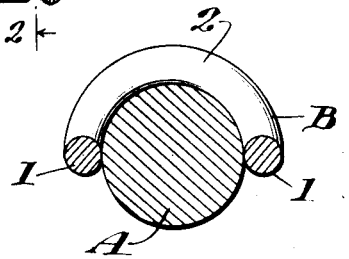
Figure 3 is a section on the line 3—3 of Figure 1.

The member B is illustrated as having two side portions 1 which are connected by transverse portion 2 which is curved to conform with the periphery of the handle A and as clearly shown in Figures 2 and 3, this transverse connecting portion 2 extends approximately halfway around the handle A. A clamp 3 formed of a strip of resilient material is provided at each side with an outwardly presssed seat 4 adapted to pass over the side members 1 of the part B. This clamp member 3 also has parallel ears 5 which are drawn together by a screw bolt 6 provided with a nut 7. It is apparent that in order to fasten together the handle A and the member B it is only necessary to slip the clamp 3 into position, insert the screw bolt 6 and by means of the nut 7 draw the ears 5 of the clamp toward each other until the clamping action is sufficient to hold the parts against accidental displacement. It is apparent that since the ears 5 extend in a direction substantially perpendicular to a plane in which the seats lie, a tightening of the clamping bolt 6 will draw the ears towards each other and will thus clamp the seats against the side portions of the frame. In this way the side portions are pressed against the handle in a direction directly inwardly towards the center of the handle.

Figure 1:
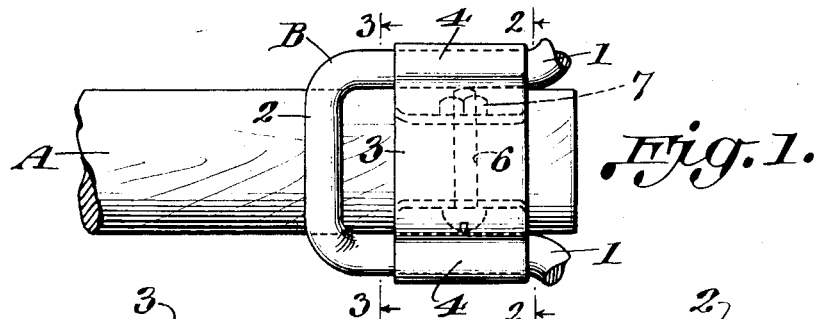
Figure 1 is a top plan view of one form of the invention.
Figure 4:
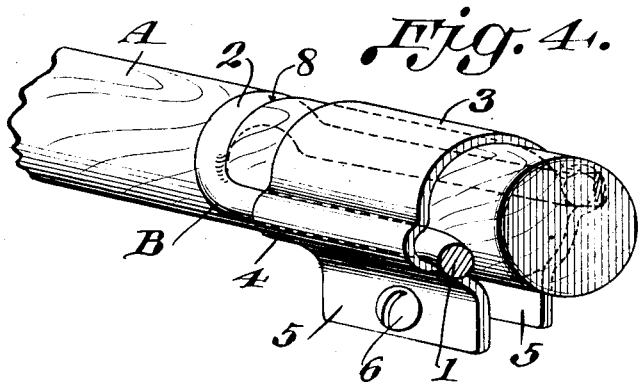
Figure 4 is a perspective view of a slightly modified form.

In the form of the device shown in Figure 4, the connecting member 2 fits into a groove 8 cut in the handle A so that the outer surface of this member lies substantially even with the surface of the handle A. In this form the parts may be held in position with less clamping action than if the construction shown in Figure 1 is employed.

Figure 5:
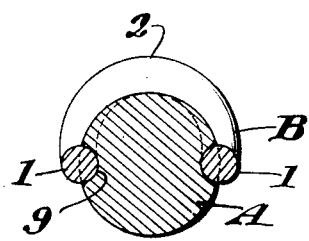
Figure 5 is a section similar to Figure 3 of a further modification.

It is also possible to have the longitudinal portions 1 of the member B fit wholly or partially in grooves 9 as shown in Figure 5. This form may be employed either with the transverse connecting member 2 positioned as in Figure 1 or with this member fitting in the groove 8 shown in the Figure 4 position.

This invention permits the handle to be separated from the tool very quickly and easily whenever it is desired to insert a new handle or to separate the parts for the purpose of packing, storing or similar purposes. It also enables a single handle to be used alternately with a plurality of tools, if such is found necessary or desirable. It is obvious that various detail changes may be made in the precise embodiment of the invention without in any way departing from the spirit thereof which is to be regarded as limited only by the scope of the appended claims.

I claim as my invention:

1. The combination with a tool handle of a frame member having portions lying against the sides of the handle and connected by a cross piece, said handle having a groove in which said cross piece lies, a clamp passing substantially around said handle and outside said portions, and means for causing the clamp to hold the portions in close engagement with the handle.

2. The combination with a tool handle; of a tool supporting frame attached to the handle for connecting a tool thereto, said frame being provided with spaced, diametrically opposed, parallel side portions contacting with opposite sides of the handle; a clamp passing substantially around the handle and over said side portions, said clamp being formed of a strip of resilient material conforming to a portion of the periphery of the handle and provided with oppositely disposed outwardly extending parallel seats for receiving said side portions, said clamp being also provided with a pair of spaced ears extending in a direction substantially perpendicular to a plane in which the seats lie; and means exterior of the handle for drawing the ears towards each other to clamp the seats against the side portions of the frame whereby the side portions are pressed against the handle in a direction directly inwardly towards the center of the handle.

In testimony whereof, I have hereunto subscribed my name.

CAMILLE J. ROCQUIN.